United States Patent [19]

Taylor

[11] 3,950,622

[45] Apr. 13, 1976

[54] LINE FAULT LOCATING SYSTEM

[75] Inventor: Steven C. Taylor, San Mateo, Calif.

[73] Assignee: Culbertson Industries Inc., Palo Alto, Calif.

[22] Filed: Oct. 15, 1974

[21] Appl. No.: 514,361

[52] U.S. Cl. ................ 179/175.31 R; 340/347 DD
[51] Int. Cl.² ....................... H04B 3/46; H04B 1/60
[58] Field of Search ............ 179/175.31 R, 175.3 R; 340/347 DD

[56] References Cited
UNITED STATES PATENTS

| | | | |
|---|---|---|---|
| 3,760,127 | 9/1973 | Camiciottoli et al. ..... | 179/175.31 R |
| 3,770,913 | 11/1973 | Camiciottoli et al. ..... | 179/175.31 R |
| 3,842,220 | 10/1974 | Arras ..................... | 179/175.31 R |

Primary Examiner—Douglas W. Olms
Attorney, Agent, or Firm—Lindenberg, Freilich, Wasserman, Rosen & Fernandez

[57] ABSTRACT

A method and means for fault testing the transmit and receive sections of repeaters which are connected in a pulse code modulation (PCM) transmission system, from a single end of said system, as described wherein testing between a first and second station is effectuated by sending between the first and second stations, a spaced trio pulse train with bipolar violations which are converted at the second station to a spaced trio pulse train without bipolar violations and then returned to the first station. When spaced trio bipolar signals are sent from the first to the second station, the second station converts these to a spaced trio bipolar signal pulse train with violations and sends these back to the first station. The testing circuits in the outgoing and incoming lines are only operative in the presence of a bipolar pulse train with violations.

6 Claims, 4 Drawing Figures

LINE FAULT LOCATING SYSTEM

BACKGROUND OF THE INVENTION

This invention relates to a method and means for fault testing repeaters in a transmission system, and more particularly to improvements therein.

PCM transmission systems usually comprise, between stations, a line pair which is connected between repeaters, there usually being one repeater at every mile. While there are two line pairs provided for transmission in both directions, for economy's sake, one cable may contain line pairs for both directions. Each repeater has a receive and a transmit section which is connected in a manner to respond to incoming signals and transmit them in a direction intended for transmission. These repeaters are well known in the art.

In the event of a fault at one of the repeaters, the problem arises as to how one can determine which one of the many repeaters between stations is the defective one. In order to assist in fault detection, an audio frequency filter is provided at each repeater housing, which is coupled to the repeater in that housing. The audio frequency filter passes a specific frequency, which is different for each repeater housing. The output of the audio frequency filter is coupled to a cable pair, otherwise designated as a fault locating pair. By driving the span or system between two stations with special signals at different audio frequency rates and monitoring the signals returned on the fault locating pair, one can identify the repeater housing (hence the repeater) which is at fault.

It was indicated as economically desirable to arrange spans for one cable operation in which both transmit and receive directions use the same cable and share fault locating filters and the fault locating cable pair. With such an arrangement, the fault locating signal may only exist in one direction at a time or any measurements made would be meaningless. This makes it impossible to test the repeaters in the transmit and receive directions or in both directions, from one end by sending test signals from one end down to the opposite end and then looping them so that they return to the original station. With the presently known techniques for testing, assuming a fault did occur with such an arrangement, it would be impossible to detect whether a fault occurred since the received signal could result from a pulse traveling away from the testing end or toward the testing end.

One attempt at solving this problem is to install two amplifiers at each repeater housing and simplex their power on the fault locating pair, through diodes. By reversing the power feed polarity, only one amplifier is enabled and therefore only one direction is tested at a time. However, not only is this arrangement expensive, since two amplifiers and associated circuitry must be installed at each repeater, but it also weakens the maintenance system. The reason for this is that the amplifiers, which are active devices, are subject to the same internal or external damage as the repeaters themselves. For example, a lightning storm is as likely to damage an amplifier as a repeater. It may be also noted that a substantial number of systems are installed without provision for amplifiers and therefore retrofit would be costly. Accordingly, such systems are usually tested first from the office at one end, and then from the office at the other end of the span.

OBJECTS AND SUMMARY OF THE INVENTION

An object of this invention is to provide a method and means for locating faults in a system of the type described, which can be operated from a single end of such system.

Yet another object of the present invention is to provide a fault locating system which is operable from one end of a PCM transmission system and is not subject to damage by the causes which usually impair repeaters.

Still another object of the present invention is the provision of a novel and relatively inexpensive fault locating system in a PCM transmission system.

The foregoing and other objects of the invention may be achieved in an arrangement wherein circuitry is provided at both ends of a span line such that test signals, normally transmitted over the span lines, are transmitted in a test mode from one end of the span line toward the other end of the span line and are then converted into a non test mode and returned to the transmitting end of the span line. The results of transmitting the test mode signals in one direction are observed on the fault locating cable pair at said one end of said span line for determining which of the repeaters in the outgoing direction of the span line are at fault.

In order to test the span line in the incoming direction, test signals are converted at said one end location into a non test mode and are then transmitted to the far end of the span line. At the far end of the span line these signals are converted into the test mode and are then sent back to the one end location. At that location, the signals received on the fault locating cable pair are inspected to determine which of the repeaters in the return direction is faulty.

The test mode or test signal, known as a bipolar signal with a bipolar violation, consists of a pulse train made up of pulse groups that consist of spaced trios, or three pulse signals in which usually the first signal has one polarity, the second signal a second polarity, and a third signal has the same polarity as the first signal. The non test signal mode consists of a pulse train in which the signals are bipolar, that is a signal will have one polarity followed by a signal of the opposite polarity. The bipolar signals are usually error free and repeater fault location using these signals at present is not possible.

The novel features of the invention are set forth with particularity in the appended claims. The invention will best be understood from the following description when read in conjunction with the accompanying drawings.

DESCRIPTION OF THE PREFERRED EMBODIMENT

Figure 1:
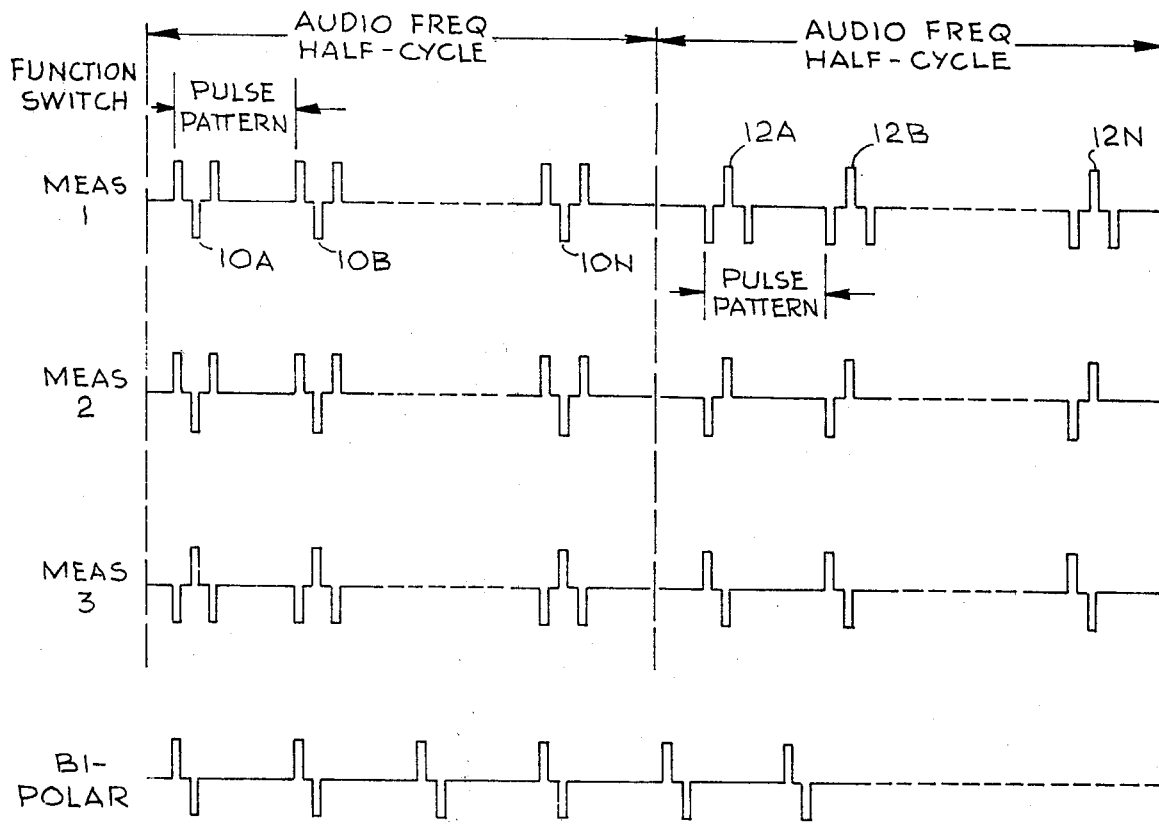
FIG. 1 is a wave shape drawing illustrating the basic pulse patterns which are transmitted on a pulse code modulated transmission system for effectuating repeater testing.

Referring now to FIG. 1, the normal PCM signal sent on a PCM transmission system is a bipolar signal that is sent, usually at some basic frequency such as 1½ megahertz. The repeaters, and there may be many more of these between stations, sense whether or not a pulse is present and regenerate that pulse and send it out. They can also sense the presence of zeros. One of the methods developed by manufacturers for testing repeaters is to transmit therethrough, a bipolar pulse train with a bipolar violation. A bipolar violation is a pulse adjacent a bipolar pulse which has a polarity opposite to the pulse which it follows. This is known as a triplet. A bipolar pulse train is shown in FIG. 1 designated as "Bipolar." MEAS 1 has triplets respectively designated as 10A, 10B, 10N, over an interval designated on the drawing as audio frequency half cycle. This is followed by triplets designated as 12A, 12B, 12N, over an interval also designated as audio frequency half cycle.

In testing, the triplets are not sent one after another but rather at certain rates which are determined by the spacing between triplets. This can consist of one or more zeros. It should be noted that the triplets 10A, 10B, and 10N have two positive going pulses each and one negative going pulse. Also, the triplets 12A, 12B, and 12N have two negative going pulses and one positive going pulse. Accordingly, when a wave train of this type is sent over the transmission line, the transmission line will be biased positively by the triplets 10A, 10B, 10N and negatively by the triplets 12A, 12B, and 12N, and thereby an audio signal may be transmitted whose amplitude is determined by the density of the positive and negative going pulses in the respective intervals in which these are transmitted, and whose frequency is determined by the length of the audio frequency half cycle period.

In the test systems commercially used nowadays, the triplet transmission occurs in a manner so that 12 different audio frequencies appear on a transmission line. For a given span, the audio filters which couple each repeater to the fault locating cable pair are tuned to pass one of these audio frequencies. As a result, by transmitting the triplets at the different frequencies and monitoring the signals returned over the fault locating cable pair, the repeater which is at fault may be located. The audio frequency range employed is from 800 cycles up to approximately 3KC.

There may be several different PCM systems extending between two stations and there will be a repeater for each different system. All of the repeaters in a given repeater housing are coupled to a single audio filter which is coupled to a single fault locating cable pair. The problem is in determining which one of the repeater housing locations along a given span contains a faulty repeater. Once that location is obtained, then a repair man travels to that location and can very readily determine which one of the several repeaters in that location is defective. The manner in which a repeater manifests the fact that it is defective is that either it will not pass pulses or the pulses it does pass have an amplitude which is lower than the norm for the repeaters when they are operating properly. In either case, this is manifested by either the absence of an audio signal being returned or one whose amplitude is lower than is to be expected.

In addition to transmitting signals of the type represented by MEAS 1 in FIG. 1, pulse train signals are transmitted which are represented in FIG. 1 by MEAS 2 and MEAS 3. Both MEAS 2 and MEAS 3 waveforms show triplets in the first half of an audio frequency half cycle and a bipolar signal in the second half of the audio frequency half cycle. The MEAS 2 triplets have more positive going pulses than the MEAS 3 triplets and therefore the MEAS 2 waveform produces positive audio half cycles on the span and the MEAS 3 signal produces negative half cycles on the span. Using these signals one can determine whether the fault in a repeater is with positive going or negative going biases. In testing, first a MEAS 1 signal is transmitted at a low pulse density and the receiver is calibrated by adjusting the receiver gain control for a zero DB meter reading. Thereafter, MEAS 2 and MEAS 3 signals are transmitted. The return signal should be about 6 DB lower than MEAS 1. The comparison with the MEAS 2 and MEAS 3 meter readings shows the relative response of the repeater to positive or negative biases. Once the receiver has been calibrated the MEAS 1, 2 and 3 signals are transmitted in a manner to produce increasing audio frequencies on the line. Deviations of the meter at the receiver from the reference settings are then noted and recorded, whereby location of the repeater housing containing a faulty repeater can be determined.

The foregoing is by way of background of the testing procedures which are now used, and to provide a better understanding and appreciation of the invention. It should be appreciated that when fault locating signals of the type shown in FIG. 1 are transmitted over a single cable pair system, it is necessary to test the system from both ends thereof in order to test each repeater for reception and transmission in both directions. These signals cannot be sent down from a single station and provide information at that station for the reception and transmission operability of the repeaters in both directions.

In accordance with this invention, a method and means for testing in both directions the transmission system, from one end thereof, is achieved by an arrangement whereby a bipolar violation may be removed from the signal initiated at one end of the system and may be reinserted at the other end of the system. Thus, if it is desired to test the transmission system in the outgoing direction from one end, MEAS 1, 2 and 3 signals, as shown in FIG. 1, are transmitted from said one end to the other end at which location the bipolar violations in the receive signals are removed and the signals are returned as bipolar signals. Thus, any faults which are detected by the fault detection system including the fault locating cable are faults in the repeaters in the outgoing direction. When it is desired to test the repeaters in the return direction, then the MEAS 1, MEAS 2 and MEAS 3 signals which are generated at the one end of the transmission system are there converted to bipolar signals and then are transmitted toward the other end of the system. At the other end of the system, the bipolar signals are reconverted into triplet signals of the type shown in FIG. 1. These are then sent back toward said one end of the system. As a result, any faults detected by the fault detecting system are those in the repeaters operated in the course of the signals being returned to the one end of the system.

Figure 2:
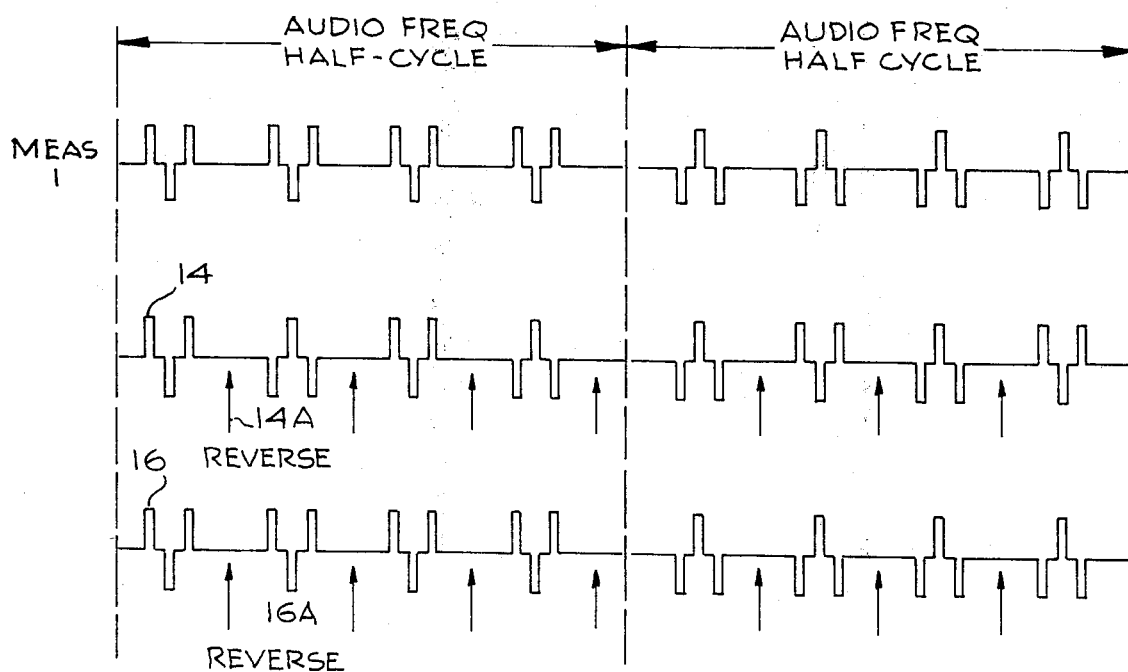
FIG. 2 is a wave shape diagram, shown to assist in an understanding of this invention, which illustrates the wave forms which are transmitted in accordance with this invention.

Referring to FIG. 2, there is an illustration of the manner in which the wave forms are handled in order to effectuate bidirectional testing from one end of a PCM transmission system. The MEAS 1 signal is repeated in FIG. 2. In accordance with this invention, a circuit is provided whereby when the MEAS 1 signal is applied thereto, it is converted into a bipolar signal 14. The conversion must be such as to maintain all pulse reference positions so that when and if reconversion to the triplet wave form is performed, both the frequency and the polarity of the pulses will be identical to that of the MEAS 1 signal or, to the MEAS 2 or MEAS 3 signal, as the case may be. This is shown by the waveform 16, which represents the reconversion of the bipolar waveform 14 to the triplet form which is substantially identical to the MEAS 1 signal.

Figure 3:
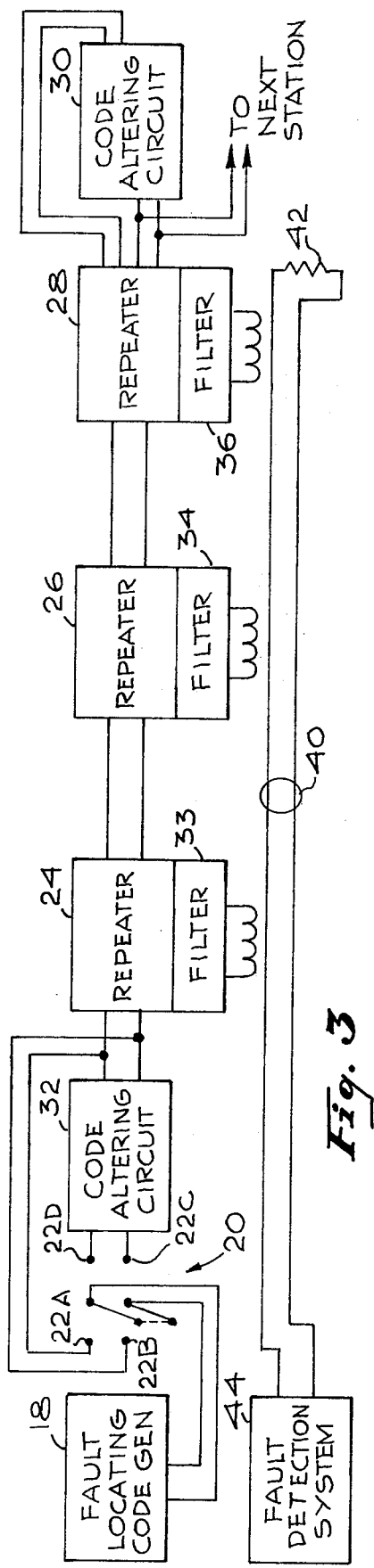
FIG. 3 is a block schematic diagram illustrating how the fault locating circuits in accordance with this invention would be connected into a PCM transmission system.

FIG. 3 is a schematic diagram illustrating one manner in which this invention may be used in a PCM system. A fault locating code generator 18, which is the circuit arrangement for generating the fault locating codes, and is well known and commercially available, has its output connected to a double pole double throw switch 20. When it is desired to test the repeaters 24, 26, 28 in the outgoing direction, then the switch 20 is connected to contacts 22A, 22B, whereby the fault locating code output of the generator 18 is applied to the transmission line. The code which is sent comprises the MEAS 1, MEAS 2 and MEAS 3 signals shown in FIG. 1. The office at the far end of the line is equipped with a code altering circuit 30, which comprises a circuit in accordance with this invention. The code altering circuit converts these pulse trains received from the last repeater 28 in the line, into a bipolar signal such as 14, and removes the bipolar violation. This bipolar signal may then be sent back down the line to the office at the other end of the line.

The fault locating code, which is first generated, is one which produces a resultant audio frequency to which the filter 33 associated with the repeater 24 is tuned, then produces a resultant audio frequency to which the filter 34 associated with the repeater 26 is tuned, and finally produces a resultant audio frequency to which the filter 36 associated with the repeater 28 is tuned. These filters are coupled to the fault locating pair 40 which has one end connected across an impedance 42, and the other end is connected to a fault detecting system 44. Fault detecting system 44 is well known, commercially purchasable, and may comprise the amplifiers, meters and/or recorders which are normally used in the environment described.

Any faults located in the repeaters will be those in the direction going from the transmitting station to the far end of the line. There will be no confusion with the signals being returned since these are bipolar signals.

In order to operate a system to test the transmission line in the return direction from the far end of the line, the double pole double throw switch 20 is now operated to close on contacts 22C, 22D. The code altering circuit 32, which is connected between these contacts and the line will then receive the MEAS 1, MEAS 2, and MEAS 3 signals and will convert these to bipolar signals of the type represented by the wave form 14 in FIG. 2. These bipolar signals will be received at the far end of the line where the code altering circuit 30 will convert them back to tripolar signals of the type represented by the wave form 16 in FIG. 2. Thus, these tripolar signals, or bipolar signals with bipolar violations are only transmitted on the transmission system, in a direction going from the far end of the line back toward the transmitting end of the line. As a result, any faults located by the fault detecting system will be those of a repeater being tested in the direction indicated. Accordingly, in accordance with this invention, a system of the type described may be tested in both directions from one end of the line.

Figure 4:
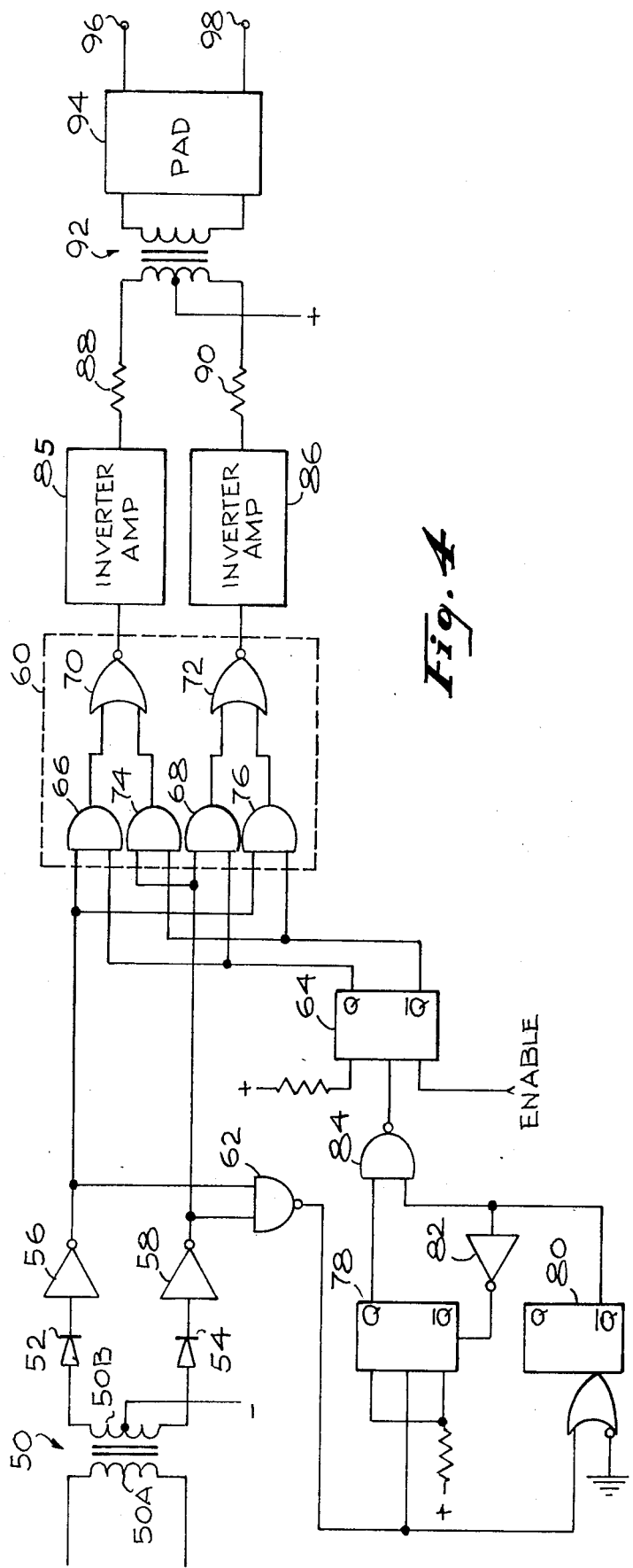
FIG. 4 is a schematic diagram illustrating a circuit in accordance with this invention.

FIG. 4 is a block schematic circuit diagram of a circuit which can remove the bipolar violation from a triplet signal wave train and can reinsert the bipolar violation into a wave train from which most bipolar violations have been removed. The signals are applied to the input winding 50A of a transformer 50, and the output winding 50B, has its center tap connected to a potential source, which serves as a "slicing" voltage to enable optimum detecting of a pulse. The other ends of the secondary transformer winding are connected to two diodes respectively 52, 54. The diode outputs are applied to two inverter amplifiers respectively 56, 58, whose outputs are connected to an electronic polarity inverting circuit 60, which is enclosed within the dotted rectangle, and also to a NAND gate 62. The polarity inverting circuit 60 is controlled by the Q and $\bar{Q}$ outputs of a flip flop 64. When the Q state of the flip flop is high then AND gates respectively 66 and 68 are enabled to provide outputs to NOR gates respectively 70 and 72. When the $\bar{Q}$ output of flip flop 64 is high, then AND gates 74 and 76 are enabled to apply outputs to NOR gates respectively 70 and 72. AND gate 66 is connected to apply the output from the amplifier 56 to the NOR gate 70, when it is enabled. AND gate 76 is enabled to apply the output of amplifier 56 to the NOR gate 72, when AND gate 76 is enabled. AND gate 74, when enabled, applies the output of amplifier 58 to the NOR gate 70, and AND gate 68, when enabled applies the output of the amplifier 58 to the NOR gate 72. From the foregoing it should be seen that when flip flop 64 has its Q state high, then the output from the amplifiers 56 to 58 are applied to the NOR gates 70 and 72 directly. When the $\bar{Q}$ output of the flip flop 64 is enabled, then the output from amplifiers 56 and 58 is inverted or the polarity of the line connections are reversed and then applied to the NOR gates 70 and 72.

NAND gate 62 serves the function of converting its input into a unipolar pulse train. This unipolar pulse train serves to drive flip flop 78 between its set and reset states wherein its respective Q and $\bar{Q}$ outputs ar high. The unipolar pulse train is also applied to a one shot circuit 80, which stays in its set state until the occurrence of the pulse interval following the pulse which drove it to its set state. If the succeeding pulse interval is zero then the one shot resets. If the pulse interval is a one then the one shot remains on with its Q output high. When the reset $\bar{Q}$ output of the single shot circuit 80 is high, it resets flip flop 78 through an inverter 82.

A NAND GATE 84 is enabled in response to the Q output of flip flop 78 and the $\bar{Q}$ output of single shot 80. The output of NAND gate 84 serves as clock pulses to drive flip flop 64 between its set and reset states.

The output of NOR gate 70 is amplified by inverter amplifier 85. The output of NAND gate 72 is amplified by inverter amplifier 86. The outputs from these amplifiers are then applied to resistors 88 and 90 respectively and then to the primary winding of a transformer 92. The output from the transformer is applied to a pad 94, whose output is thereafter applied to output terminals 96 and 98, which are coupled to the line in a manner shown in FIG. 3.

Considering now the operation of the circuits shown in FIG. 4, assume first that a triplet pulse pattern such as the type represented by MEAS 1 in FIG. 2 is applied to the input transformer 50. The NAND gate 62 inverts the input to unipolar pulses. The first pulse of a triplet drives flip flop 78 to its set state and one shot 80 too its set state with the Q output high. The second pulse of the triplet drives flip flop 78 to its reset state and one shot 80 remains with its Q output high. The third pulse of the triplet drives flip flop 78 to its set state and one shot 80 remains with its Q output high.

After the occurrence of the third pulse of the triplet, flip flop 78 remains set with its Q output high. However, upon the occurrence of the next pulse position after the third pulse, which is zero, one shot 80 resets. When one shot 80 resets, NAND gate 84 receives its two enabling inputs from the Q output of flip flop 78 and the $\overline{Q}$ output of one shot 80 and thus applies a clock pulse to flip flop 64 causing it to reverse the outputs from the transformer 50 which are applied to the NOR gates 70 andd 72. One shot 80 in resetting, resets flip flop 78.

The first three pulses of the MEAS 1 wave form have thus passed through to the line without having their polarity altered. However, since the polarity of the line has now been reversed, the next pulse of the second triplet will be passed through to the line inverted. The second pulse of the second triplet will also have its polarity inverted since the line connections to the NOR gates 70 and 72 will still not be reversed in response to this second pulse of the second triplet. The third pulse of the second triplet will also have its polarity inverted since the line connections have still not been reversed. However, upon the occurrence of the third pulse of the second triplet NAND gate 84 is again enabled due to flip flop 78 being set. The absence of a pulse following the third pulse of the second triplet causes one shot 80 to reset which causes the flip flop 64 to be reset with its $\overline{Q}$ output high thereby restoring the connections between the secondary winding of the transformer and a NOR gate 70, 72 to their original state. Accordingly, the third three pulses of the third triplet will pass to the line with their polarities uninverted.

From the foregoing it will be appreciated that the circuitry shown in FIG. 4 functions to invert the polarity of every other triplet which gives rise to a wave train represented by a wave train 14 in FIG. 2 wherein the bipolar pulse violations have been removed and effectively what the line sees is a bipolar wave train. It should be noted that the width and spacing of the MEAS 1 pulses is maintained in waveform 14. Only polarity is reversed.

The same circuit which has just been described functions to restore the bipolar violations to the bipolar wave train when it is applied to the circuit. Assume that the wave train 14 is applied to the input transformer 50. The first second and third bipolar pulses will not affect the polarity reversing circuit 60. However after the third bipolar pulse, flip flop 78 will be left in its set state with its Q output high. One shot 80 then resets since there is at least one zero interval between the first and second triplets which were converted into a bipolar wave train by the circuit. The zero region is shown by the arrows on waveform 14. Upon the occurrence of the zero interval, the one shot circuit 80 is reset, whereby NAND gate 84 is enabled and the polarity of the output from transformer 50 to the NOR gates 70 and 72 is reversed. As a result of such polarity reversal, the next three pulses in the bipolar wave train have their polarities reversed. Regarding wave train 16, it will be seen that the bipolar violation has been restored. The circuit operates to reverse the polarity of every other three pulses in the bipolar train 14. The arrows 14A and 16A for example, shown adjacent wave trains 14 and 16 indicate where there are zeroes and where the polarity reversals occur. Accordingly, the circuit shown in FIG. 4 operates to both remove bipolar violations from a wave train which has the violations and converts the wave train to a bipolar wave train, and restores bipolar wave violations to a wave train from which the violations were removed.

Accordingly, there has been described and shown herein a method and means for testing the repeaters in a PCM communication line in both directions from one end of that line. It will be appreciated that this invention may be used in a manner to be automatically connected in and out of the communication systems in a manner well known to those skilled in the art so that such operations may be completely controlled from the testing end of a communications line.

The embodiments of the invention in which an exclusive property or privilege is claimed are defined as follows:

1. In a PCM communication system where two lines extend between a first and second station and there are a plurality of repeaters in said line between said two stations which can receive and transmit signals in either direction, there being a fault locating cable pair extending between said two stations, to which all of said repeaters are coupled, a means for testing said repeaters for faults from one of said stations comprising means at said one of said stations for generating a spaced three pulse bipolar pulse train having bipolar violation signals therein, first and second circuit means each having an input and an output and comprising means for converting a spaced three pulse bipolar signal wavetrain having bipolar violations which is applied to its input into a spaced three pulse bipolar signal, wavetrain having no bipolar violations and for converting a spaced three pulse bipolar signal wavetrain having no bipolar violations which is applied to its input into a spaced three pulse bipolar signal wavetrain having bipolar violations, means for connecting the input of said second of said circuit means at said second office location to receive signals from said transmission line and for connecting its output to said first transmission line to return signals back to said first office location, means for applying the output of said pulse generating means at said first office location to said transmission line whereby a spaced three pulse bipolar pulse train with bipolar violations is transmitted between said first and second office locations, converted into a spaced three pulse bipolar wavetrain without bipolar violations by said second circuit means and then transmitted back to said first office location, whereby signals received at said first office location on said first cable pair may be monitored for determining the location of faulty repeaters in an outgoing direction, means at said first office for applying the output of the pulse generating means to the input to said first circuit means, and means for connecting the output of said first circuit means to said transmission line, whereby a spaced three pulse trio bipolar wavetrain without bipolar variations is transmitted between said first and second office locations and a spaced three pulse bipolar wavetrain with bipolar violations is transmitted between said second and first office locations, whereby signals on said fault locating pair may be monitored at said first office location for determining which of said repeaters is faulty in a return direction.

2. Apparatus as recited in claim 1 wherein said first and second circuits each comprise
input means to which a pulse signal train is applied,
polarity reversing means for interconnecting said input to said output terminals, and
means responsive to a zero pulse interval in a pulse signal train following three pulses in said wave train applied to the input of said circuit means for generating a polarity reversing signal, and
means to apply said polarity reversing signal to said polarity reversing means to cause it to reverse the polarity of the connections between said input means and said output terminals.

3. In a system as recited in claim 2 wherein said means responsive to a zero pulse following three pulses in a pulse train apply to said input means for generating a polarity reversing signal comprises
flip flop means responsive to each pulse in a pulse train applied to said input means for alternately generating a set and a reset output,
one shot means responsive to each pulse in said pulse train to be driven from its reset to its set state to remain in said set state over an interval extending until a succeeding adjacent pulse should be generated, and
means responsive to a set output from said flip flop means and a reset output from said one shot means for generating said polarity inverting pulse.

4. A circuit for converting a spaced three pulse bipolar wavetrain with bipolar violations into spaced three pulse bipolar wavetrain without violations and for converting a spaced three pulse bipolar wavetrain into a spaced three pulse bipolar wavetrain with bipolar violations comprising
input terminal means,
output terminal means,
polarity reversing means connecting said input terminal means to said output terminal means,
means responsive to three successive pulse signals followed by a zero pulse signal being applied to said input terminal means for generating a polarity reversing signal, and
means for applying said polarity reversing signal to said polarity reversing means to cause it to reverse the polarity of the connections between said input and output terminal means.

5. A circuit as recited in claim 4 wherein said means responsive to three successive pulse signals followed by a zero signal being applied to said input terminal means for generating a polarity reversing signal comprises
flip flop means responsive to each pulse in a pulse train applied to said input means for alternately generating a set and a reset output,
one shot means responsive to each pulse in said pulse train to be driven from its set to its reset state for an interval extending until a succeeding and adjacent pulse should be generated, and
means responsive to a set output from said flip flop means and a reset output from said one shot means for generating said polarity inverting pulse.

6. In a PCM communication system where only two lines extend between two stations and there are a plurality of repeaters in said lines between said two stations which can receive and transmit signals in either direction, there being a fault locating cable pair extending between said two stations, to which all of said repeaters are coupled,
a method for testing said repeaters between said first and second stations in both drections from said first station comprising
generating a spaced three pulse bipolar pulse train having bipolar violations thereon,
applying said pulse train to said transmission lines at said first station,
converting said spaced three pulse bipolar pulse train with bipolar violations into a spaced three pulse bipolar pulse train at said second station,
applying said spaced three pulse bipolar pulse train to said transmission line to be transmitted from said second station back to said first station,
monitoring the signals applied by said repeaters to said fault locating cable pair of said first station to determine which of said repeaters is faulty in a direction going from said first station to said second station,
converting said pulse train to a spaced three pulse bipolar signal train without violations at said first station,
applying said spaced three pulse bipolar signal train without violations at said first station to said transmission line to be transmitted to said second station,
converting the spaced three pulse bipolar pulse train without violations received at said second station to a spaced three pulse bipolar pulse train with bipolar violations,
applying said spaced three pulse bipolar pulse train with bipolar violations at said second station to said transmission lines to be transmitted back toward said first station, and
monitoring the signals received on said fault locating pair at said first station to determine which of the repeaters between said first and second stations have a fault in the return direction.

* * * * *